United States Patent [19]

Kinney David J.

[11] Patent Number: 4,524,573

[45] Date of Patent: Jun. 25, 1985

[54] VACUUM FINGER HARVESTER FOR STRAWBERRIES OR THE LIKE

[76] Inventor: Kinney David J., Star Rte. #2, Ozark, Ark. 72949

[21] Appl. No.: 579,356

[22] Filed: Feb. 13, 1984

[51] Int. Cl.³ .............................................. A01D 46/00
[52] U.S. Cl. ................................. 56/330; 56/328 R; 56/327 R; 56/DIG. 8; 209/905
[58] Field of Search ...................... 56/12.8, 12.9, 13.1, 56/16.5, 16.6, 327 R, 328 R, 330, DIG. 8; 209/643, 905; 198/689, 811, 955

[56] References Cited

U.S. PATENT DOCUMENTS

| | | | |
|---|---|---|---|
| 3,275,136 | 9/1966 | Allen et al. | 209/905 |
| 3,366,236 | 1/1968 | Breazeale | 209/905 |
| 3,460,327 | 8/1969 | Johnson et al. | 56/328 R |
| 3,460,330 | 8/1969 | Black | 56/328 R |
| 3,520,123 | 7/1970 | Patterson | 56/328 R |
| 3,913,307 | 10/1975 | Cardinal | 56/13.1 |
| 3,964,245 | 6/1976 | Hecht | 56/12.9 |

FOREIGN PATENT DOCUMENTS

| | | | |
|---|---|---|---|
| 2915824 | 10/1979 | Fed. Rep. of Germany | 56/330 |
| 2294627 | 7/1976 | France | 56/330 |
| 520951 | 9/1976 | U.S.S.R. | 56/327 R |
| 452309 | 10/1976 | U.S.S.R. | 56/330 |
| 955880 | 9/1982 | U.S.S.R. | 56/328 R |
| 954036 | 9/1982 | U.S.S.R. | 56/328 R |

Primary Examiner—Gene Mancene
Assistant Examiner—John A. Weiss
Attorney, Agent, or Firm—Robert R. Keegan

[57] ABSTRACT

There is disclosed a crop harvester for strawberries or other fruits or vegetables including a wheeled vehicle, preferably self propelled, adapted to pass along beds or rows of the crop and having a rotating perforated support element with hollow retractible fingers mounted over its perforations; the peripheral speed of the support element is approximately the same as the vehicle wheels. A fan or other air mover supplies vacuum pressure and positive pressure to ducts connected through the interior of said support element to said fingers; those fingers in a direction to contact the crop are connected to vacuum pressure. Fingers preceding such fingers are connected to positive pressure to eject the collected crop onto a conveyor leading to a collection receptacle. The support element may be in the form of a belt or a cylinder; the fingers are closely spaced and accordion-like and when their open end contacts a berry the finger is retracted and held by vacuum pressure with controllable force sufficient to pull a ripe berry from its stem. An air stream forward of each support element blows laterally on crop foliage to uncover the fruit of the crop.

18 Claims, 12 Drawing Figures

VACUUM FINGER HARVESTER FOR STRAWBERRIES OR THE LIKE

The present invention relates to crop harvesters for fruits and vegetables and particularly for bed grown crops such as strawberries. Typically such harvesters in the past have cut or otherwise collected essentially all the foliage and the fruit of the plants and sorted out the fruit by its greater density in an air stream separation process or the like. The present invention utilizes a quite different approach in having numerous fingers supplied with vacuum pressure and adapted to capture the berries on the end of the fingers causing the fingers to retract and be held with a controllable force just sufficient to separate ripe fruit from its stem; thus little or no green fruit is picked. With previous harvesting methods much green fruit was collected by mechanical harvesters and the harvest was suitable only for canning unless further sorting was done manually or by color sensing mechanical sorters, either of which is an expensive operation. With after-sorting there still remains a large quantity of green fruit useful at best for canning.

Selective harvesting of ripe fruit could previously be done only by hand picking. The harvester according to the present invention provides the capability of multiple pass harvesting in which the ripe fruit only is gathered. It would still be desirable to take advantage of newly developed strains of fruits which ripen nearly all at the same time, but the horticulturist will not have the impossible burden of breeding plants where every berry (or other fruit) ripens on the same day.

The harvester according to the present invention has the advantage that the foliage of the plants is virtually all left intact, which greatly simplifies any cleaning process to separate leaves and other trash from the harvested crop. Also, the apparatus of the invention is such that damage to the fruit is minimal. Although in intensive horticulture it is common to replace all of the berry plants after each crop, the present invention gives the grower the option of collecting two or more crops from the same plants. The low force used to select ripe fruit also implies a low vacuum pressure for the vacuum fingers and gentle handling of the fruit. There are no mechanical fingers or cutters moving over the crop at vehicle speed and the vacuum fingers are rotating to maintain the contact fingers at nearly zero velocity with respect to the ground and the crop.

Many crop harvesters have been devised using vacuum pressure for picking and/or transporting fruit crops, particularly treegrown crops such as citrus fruits or apples. For example manually operated booms supplied with vacuum have been used to engage apples, remove them from the tree, and in some cases transport them through a vacuum tube conveyor. See U.S. Pat. No. 3,564,826 for Article Handling Apparatus issued to W. J. Middleton, Jr., Feb. 23, 1971; and U.S. Pat. No. 3,591,949 for Fruit-Harvesting Machine, issued to William E. Connery, July 13, 1971.

Other fruit harvesting machines have employed shaking devices to separate fruit, especially grapes, from their plants. Such machines must necessarily have means to catch the dislodged fruit and necessarily some is damaged or dropped on the ground. in contrast the vacuum finger harvester according to the invention positively grasps the berries or other fruit and selectively removes the ripe berries while holding them in the grip of the finger until they are lifted over the edge of a conventional belt conveyor at which time they are automatically dropped gently onto the conveyor and transported to a collection bin. The air combs in front of the picking fingers sweep the plant foliage to one side or the other to uncover the berries and assure that a maximum number of the berries are accessible to the fingers. Preferably there are at least two sets of fingers and the combs in advance of them sweep the foliage in opposite directions to further maximize the effectiveness of harvest.

Other disclosures of systems using vacuum pressure in harvesting fruits or vegetables are found in the following patents.

U.S. Pat. No. 3,559,387, Fruit Picking Apparatus, R. R. Myers, Feb. 2, 1971

U.S. Pat. No 3,913,307, Vacuum Conduit Pick-Up Device, D. E. Cardinal, Oct. 21, 1975

U.S. Pat. No. 3,664,104, Fruits And Nuts Picking device, Krosrow Jamshidi, May 23, 1972

U.S. Pat. No. 3,756,001, Fruit Harvesting Apparatus, John C. Macidull, Sept. 4, 1973

U.S. Pat. No. 4,043,105, Electro-Pneumatic Fruit Picker, Robert W. Cochran, Aug. 23, 1977

U.S. Pat. No. 3,898,785, Vacuum Operated Fruit Picker, Clarence W. Chew, Aug. 12, 1975

U.S. Pat. No. 4,000,602, Vacuum Conduit Pick-Up Device With Improved Control, Daniel E. Cardinal, Jr., Jan. 4, 1977

These latter patents are generally less relevant than those described in the previous paragraph.

In addition to providing the features and advantages described above it is an object of the present invention to provide a harvester for fruits or vegetables, particularly strawberries, wherein a multiplicity of hollow retractable fingers are rotated on a hollow support element with a peripheral speed relative to the ground of approximately zero, so that they come in contact with the berries and are caused to retract by vacuum pressure, holding and pulling ripe berries from the vine and later releasing them onto a conveyor.

It is a further object of the present invention to provide such a harvester wherein the vehicle on which a rotating vacuum finger support element is mounted has hydraulic cylinders or other suitable means for raising or lowering its body relative to the position of its wheels thereby providing facility in adjusting the position of the fingers relative to the beds of the crop being harvested.

It is still another object of the present invention to provide such a harvester in which positive pressure is used to eject the berries from rotating vacuum fingers to a conveyor and is also used by an air comb to sweep foliage to one side or the other to uncover berries which might otherwise be covered by foliage.

It is yet another object of the present invention to provide such a harvester wherein there is a plurality of rotating support elements, one behind another, and wherein the direction of air flow from the air comb in front of the second support element is different than it is in the air comb in front of the first support element.

Other objects and advantages of the invention will be apparent from consideration of the following description in conjunction with the appended drawings in which.

Figure 1:
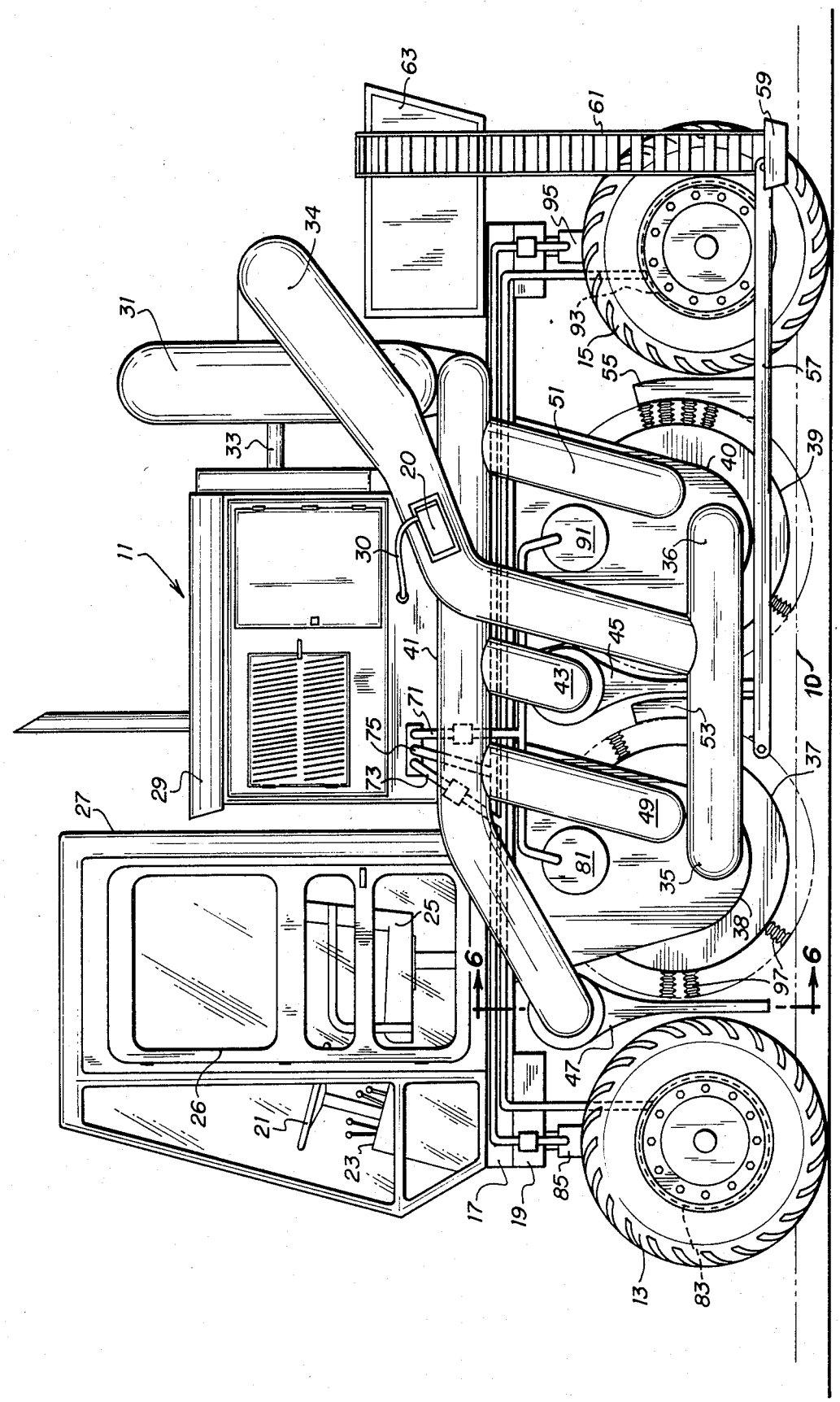
FIG. 1 is a side elevational view of harvester apparatus according to the invention.

Referring now to the drawings and particularly to FIG. 1, a harvester 11 for strawberries or the like is in the form of a self-propelled vehicle having two front wheels 13 and two rear wheels 15 (only the left wheels being shown). Harvester 11 has a body 17 on the front of which is a steering mechanism 19 for front wheels 13. The vehicle is steered by a conventional steering wheel 21 and may have power assisted steering if desired. A control console 23 has appropriate controls for hydraulic mechanisms later to be described and may have appropriate conventional gauges (not shown) for an agricultural vehicle.

A driver's seat 25 of conventional form is provided together with a cab 27 for enclosing the driver-operator position. A door 26 is provided in cab 27.

A motor and pump housing 29 encloses a diesel engine or other internal combustion engine of about one hundred horsepower or more together with conventional hydraulic pumps and other mechanical equipment required for powering and operating the various components of the apparatus. The engine is preferably provided with a governor mechanism and normally operates as a constant speed motor.

A power takeoff shaft 33 powers a centrifugal fan 31 which creates both positive and negative pressure for the apparatus. Fan 31 may have a capacity of 500 to 5000 cubic feet per minute. Negative pressure duct 34 feeds to branches 35 and 36 leading to rotating support elements 37 and 39 respectively. The negative pressure is variable in the range of 2 to 60 ounces per sq. inch by means of a door 20 in duct 34; door 20 is controlled by mechanical control cable 30 or by hydraulic or electric means under the operator's control. Duct 34 may also be provided with a damper for pressure control.

Rotating support element 37 is mounted to body 17 by mounting structure 38 while rotating support element 39 is similarly mounted by mounting structure 40. The overall diameter of rotating support element 37 may be from 3 to 6 feet and it's width may be from 6 to 10 feet.

A positive pressure duct 41 leads from fan 31 to front air comb 47 and has a branch duct 43 leading to rear air comb 45.

Additional branch ducts 49 and 51 from positive pressure duct 41 lead to rotating support elements 37 and 39 respectively.

Crop collector units 53 and 55 are mounted to the rear of rotating support elements 37 and 39 respectively to receive the strawberries or other crop which is released from or ejected from fingers 97 mounted on rotating support elements 37 and 39. A horizontal conveyor 57 carries the collected crop from collectors 53 and 55 to a receiver 59 which channels the crop onto a vertical conveyor 61 leading to a bin 63. Conveyor 61 may be of the bucket form or other suitable type. Bin 63 may be removable and arranged to be replaced by an empty bin. The provision for handling the crop after being collected in bin 63 may be conventional and forms no part of the present invention.

Preferably all motivation and power for the vehicle is transmitted by hydraulic means and hydraulic conduits 71, 73, and 75 connected to conventional pump means (not shown) within housing 29. Conduit 71 supplies liquid under pressure to drive hydraulic motors 81 and 91 and return lines (not shown) are provided in customary fashion. The hydraulic motors 81 and 91 may be supplied with hydraulic fluid either in series or in parallel connection, but an advantage of series connection is that equal speed of rotation for rotating support elements 37 and 39 is readily maintained.

Hydraulic line 73 leads to hydraulic motors 83 and 93 driving wheels 13 and 15 respectively; preferably parallel connection of wheel drive motors 83 and 93 (which will have counterparts on the right side of the vehicle) is used.

Hydraulic line 75 connects to hydraulic linear actuaters 85 and 95 which serve to increase or decrease the vertical distance of wheels 13 or 15 relative to vehicle body 17. In this fashion the height of the body 17 above the ground line 10 and thus the vertical positioning of rotating support elements 37 and 39 with respect to the strawberry beds to the crop location may be accurately controlled.

It will be apparent that conventional mechanical or electrical drive may be substituted in whole or in part for the hydraulic drive means illustrated in the preferred embodiment. The harvester of the invention has been shown and described as self-propelled but it could be trailer mounted and powered by its own engine or by a power take-off from the tractor vehicle.

While the rotating support elements 37 and 39 should rotate so that their peripheral speed nearly cancels the vehicle speed of travel, it may be desirable to have a small difference between the two with a resultant forward or rearward pull on the fruit being gathered. Thus a speed difference of up to 1 foot per second is tolerable and may even be desirable.

Figure 2:
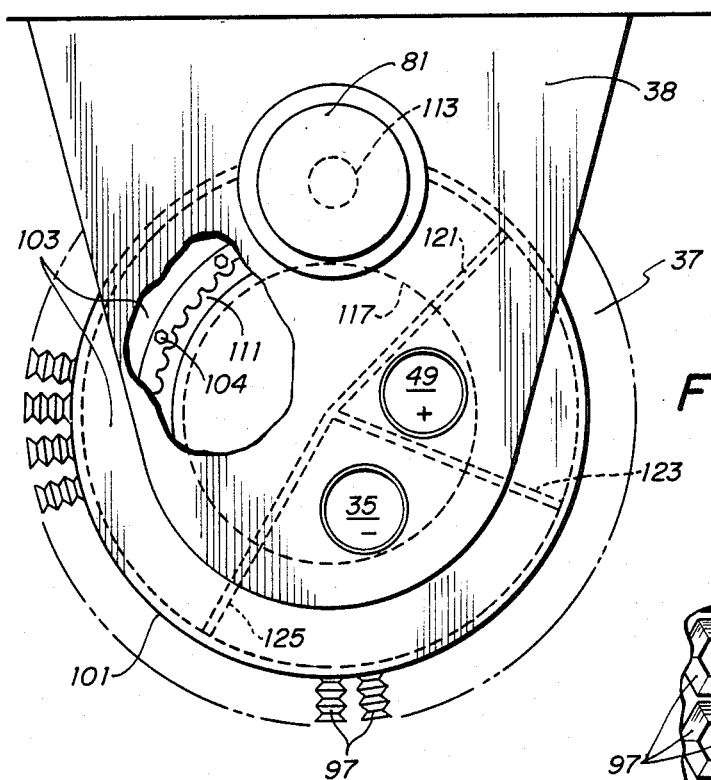
FIG. 2 is an enlarged view partially broken away showing the cyclindrical rotatable support element and retractable fingers of FIG. 1.
Figure 4:
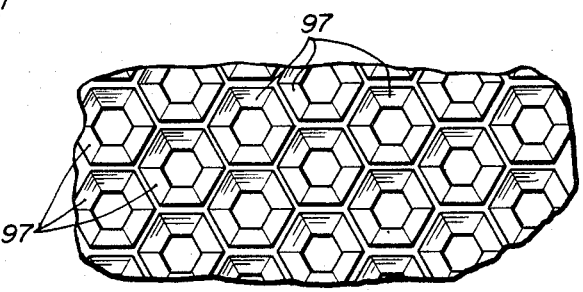
FIG. 4 is a further enlarged detail view of a portion of the periphery of the support element and hollow finger elements showing an end view of the finger elements.
Figure 3:
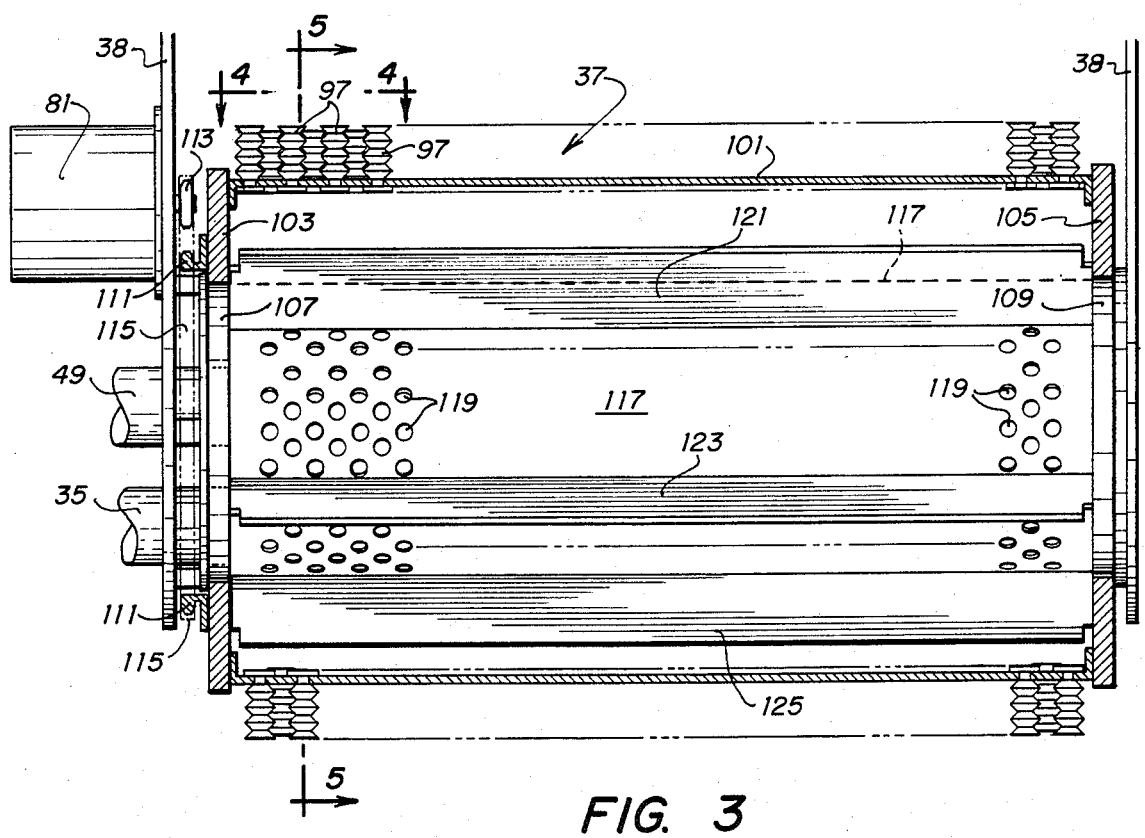
FIG. 3 is a front elevational view of the apparatus of FIG. 2 partially in section.

FIGS. 2, 3, and 4 show details of the rotating support elements 37 and 39. They are similar in construction; support element 37 is specifically shown. Support element 37 is positioned between mounting structure elements 38. A cylinder 101 has fingers 97 mounted thereon and is secured at its ends to respective ring elements 103 and 105 which are rotatable with respect to bearing units 107 and 109. The bearing units 107 and 109 are secured to the mounting structure elements 38 and thus are stationary while rings 103 and 105 together with cylinder 101 and fingers 97 are rotatable about the axis of bearing units 107 and 109. If desired, ball bearings or other anti-friction bearings may be incorporated in bearing units 107, 109, or rings 103, 105.

A ring sprocket 111 is secured to ring element 103 and is driven from a small drive sprocket 113 on motor 81 through a sprocket chain 115, all in conventional manner. A sprocket chain is simple and durable as well as being easy to maintain and repair, but other standard forms of drive such as belt drive or gear drive might be employed. A core 117 for rotatable support element 37 is provided with openings 119 while dividers 121, 123, and 125 extend radially so that the sector between dividers 121 and 123 is supplied with positive pressure from duct 49 while the sector between dividers 123 and 125 is provided with vacuum pressure from duct 35. That portion of the rotating support element between dividers 125 and 121 is open to atmospheric pressure.

As seen in FIG. 4 the fingers 97 are preferably hexagonal in shape and arranged in a hexagonal array which provides close spacing and little opportunity for fruit to escape the vacuum grip of the fingers 97. Fingers 97 could be made circular rather than hexagonal, but they would still preferably be arranged in a hexagonal array for the closest possible spacing. The fingers may be of uniform cross section from their inner to outer ends or they may taper toward the inner end as shown in the preferred embodiment of FIG. 7 and 8 which will be more fully explained hereafter.

Figure 5:
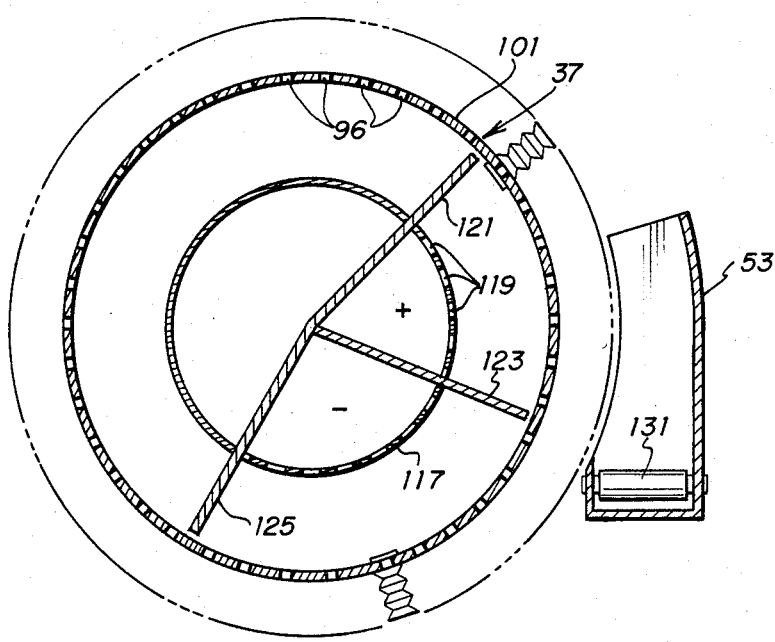
FIG. 5 is a sectional view taken along the line 5—5 in FIG. 3.

The basic organization of the fingers mounted on the rotating support element will be seen from FIGS. 2 through 5 and particularly in FIGS. 2 and 5 it will be seen that those fingers 97 which have rotated to come in contact with the strawberries or other crop on the ground are provided with a high volume of air under vacuum pressure causing air to flow inwardly through openings 96 and through the hollow accordian-like fingers 97. This causes the fingers to grip any strawberry with which they come in contact; this in turn blocks the opening at the end of the finger and causes it to retract. The force with which the finger retracts is directly related to the vacuum pressure and thus can be accurately controlled by control of the vacuum pressure. The extended fingers may be about 6 inches long and when retracted they will be at least 2 inches shorter. The finger end diameter may be about 1½ inches for strawberries.

Also as seen in FIGS. 2 and 5, after making approximately a quarter (counter-clockwise) rotation the fingers 97 will pass from the sector between dividers 123 and 125 to the sector between dividers 121 and 123. This latter sector is provided with air under positive pressure thereby causing any retracted fingers 97 to extend and eject the strawberries in their grip. As better shown in FIG. 5 a collector 53 receives the ejected strawberries which are carried by a transverse conveyor belt 131 to the horizontal conveyor 57. Horizontal conveyor 57 drops the berries in a receiver 59 which funnels them to a vertical conveyor 61 feeding into a bin 63.

In general the fingers 97 will be highly selective in plucking the fruit without pulling the foliage from the plants. A holding force of from 2 ounces to 30 ounces is provided by controlling vacuum at the finger ends. Accurate pressure control of the vacuum pressure may be provided so that the unripe strawberries will not be subjected to sufficient force to remove them from the plant. It has been found that ripe strawberries can be separated with significantly less force. To the extent that leaves of the plant are drawn to the fingers there will generally be insufficient force to pull the leaves off the plants and thus very few leaves will be deposited in collectors 53 and 55. To the extent that leaves or unwanted objects are deposited in collector 53 it will be noted that a substantial positive air flow from the fingers 97 is directed into collector 53 and will tend to blow leaves, twigs and other low density debris out of the collector.

Figure 6:
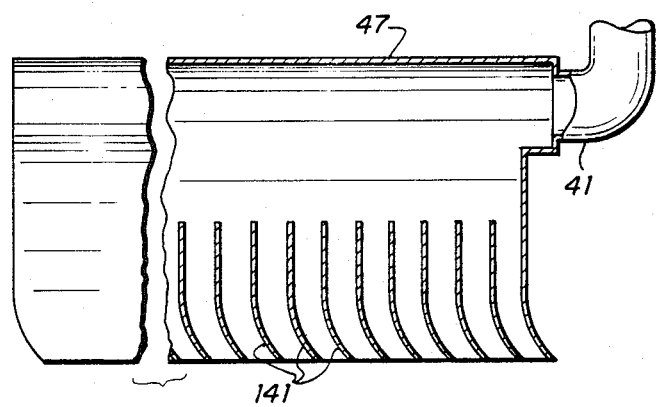
FIG. 6 is a fragmentary sectional view taken along the line 6—6 in FIG. 1.

The air comb 47 is shown in more detail in FIG. 6. It has a simple structure with deflecting vanes 141 causing the air flow from the comb to be directed to the right as viewed from the front of the apparatus. This causes leaves and vines to be laid aside uncovering the strawberries or other fruit to be picked. The air flow from air comb 45 is in the opposite direction thereby minimizing the liklihood that fruit will be missed due to being covered by leaves or foliage. Of course the number of rotating support elements is not limited to two, and a third or fourth element could be added to further reduce the amount of fruit missed in the picking process. Air combs for additional rotating support elements could have the air directed to the front or the rear if desired.

Figure 7:
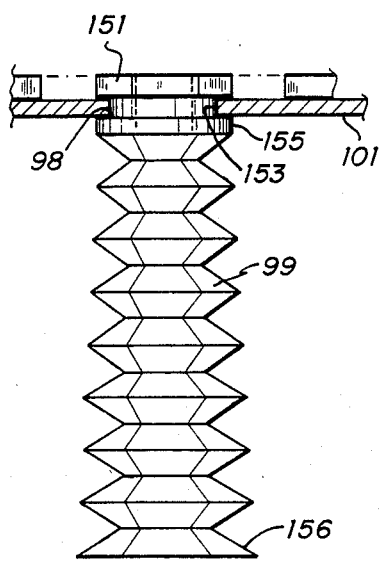
FIG. 7 is an enlarged detail view of an optional form of finger element tapered from its's larger outer end to it's base.
Figure 8:
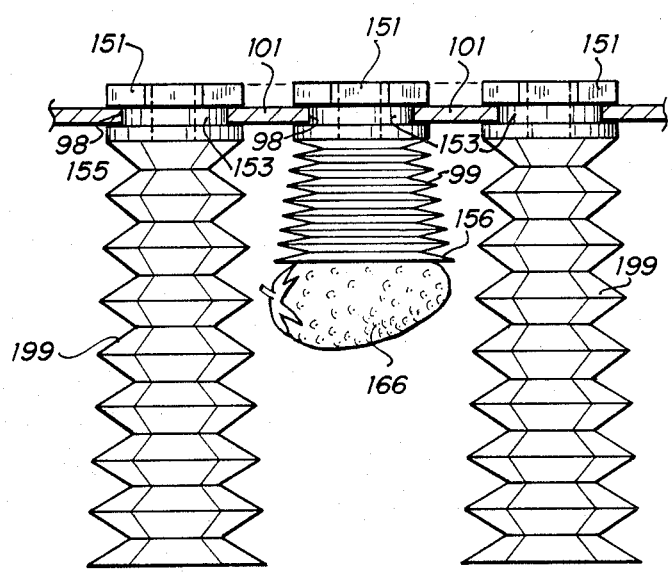
FIG. 8 is a view of the apparatus of FIG. 7 showing the finger in a retracted position assumed when it encounters a berry that is gripped and pulled free by the vacuum pressure.
Figure 9:
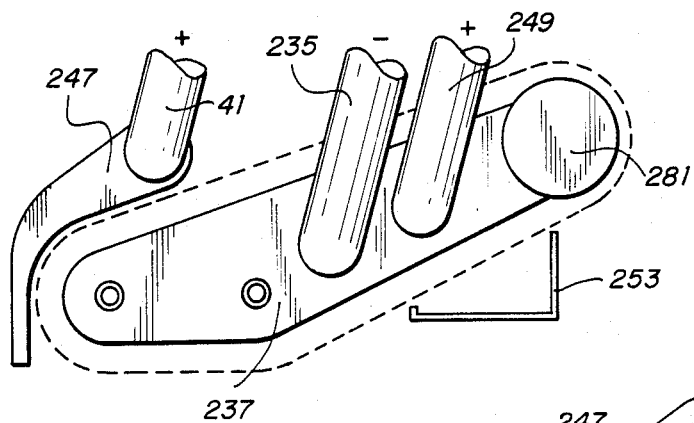
FIG. 9 is a side elevational view similar to FIG. 2 showing an alternative belt-type rotating finger support element.
Figure 10:
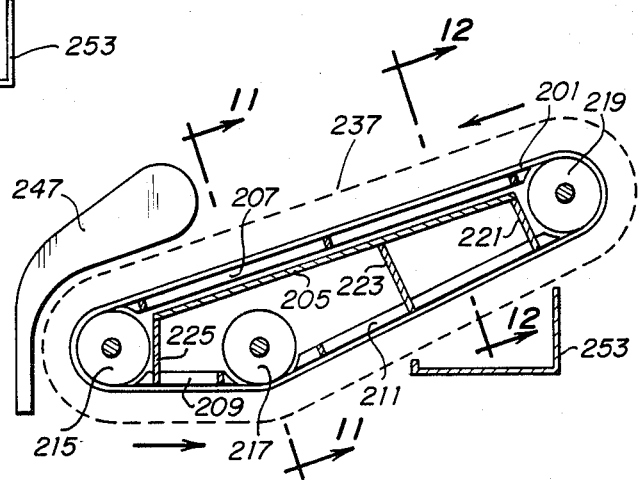
FIG. 10 is a fragmentary view partially broken away of the apparatus of FIG. 9.
Figure 11:
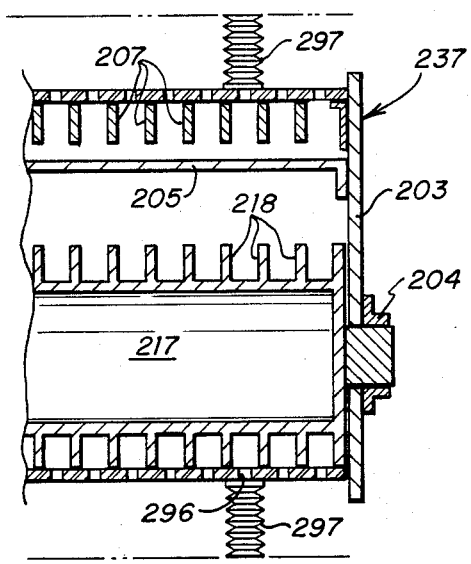
FIG. 11 is a sectional view taken along the line 11—11 in FIG. 10.
Figure 12:
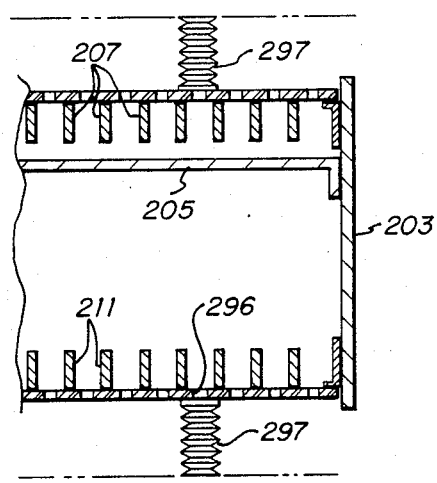
FIG. 12 is a sectional view taken along the line 12—12 in FIG. 10.

A preferred hexagonal form of finger 99 is shown in FIGS. 7 and 8 which is tapered toward its base to facilitate retraction without interference with adjacent fingers. Fingers 99 are a direct replacement for the untapered fingers 97 previously described or for circular cross section fingers.

Fingers 99 are of hexagonal, tapered, bellows shape as shown in FIG. 7 and are preferably formed of rubber or other elastomeric material. The wall thickness of the bellows may be from about 1/32 to ⅛ inch. The minimum opening through the bellows is about ¼ inch across and the maximum dimension of end flare 156 may be about 1½ inches. Finger 99 has a base 55 which may be circular and an extension 153 which is preferably circular to fit in circular opening 98 in cylinder 101. The force to retract finger 99 by one-third of its length may be on the order of 4-8 ounces. It may be desirable to make fingers 99 or 97 with quite thin walls of 1/16 inch or even less to obtain maximal flexibility and retraction capability. In such case reinforcing rings of metal or rigid plastic may be placed within the fingers to prevent transverse collapse of the fingers' bellows structure. Such reinforcement of bellows is well known and is not illustrated.

Finger 99 may be secured in place by an elastomeric ring 151 secured on the inside of cylinder 101 to extension 153 by adhesive or other suitable means. Ring 151 may be of hexagonal outline so that the plurality of rings 151 fit together to form a smooth internal surface. This arrangement allows vanes 121, 123, and 125 to have their ends in close proximity to the smooth surface formed by rings 151 and cause there to be relatively little leakage around the ends of vanes 121, 123, and 125.

Referring to FIG. 8 the operation of the vacuum fingers 99 (the operation of vacuum fingers 97 would be generally similar) in retracting to gather the strawberries or other fruit crop is shown. When the flare 156 on the end of finger 99 comes in contact with a solid object from about ½ inch to about two inches in dimension having a generally rounded surface, such object is drawn against the end of the flare 156 by the vacuum pressure thereby closing or substantially closing the opening at the end of finger 99. This produces a force on flare 156 and on strawberry 166 tending to cause retraction of finger 99 by overcoming its natural resilience. The combination of retraction of finger 99 and rotation of rotatable support element 37 (carrying finger 99 with it) will forcibly separate the strawberry 166 from the strawberry plant so long as the force required to do so does not exceed the force exerted by the vacuum pressure on strawberry 166 through the opening in the end of finger 99. This force can be determined by multiplying the area of the opening, which may be ½ square inch for example, by the vacuum pressure, which may be two pounds per square inch for example. One would in such case arrive at a holding force of one pound, which may be greater or lesser than desired in a particular instance.

It may be noted that the collected strawberries in passing along conveyor 57 will be visible to the operator through door 26 or a rear window (not shown); alternatively a mirror may be provided for convenience in watching the strawberries passing along conveyor 57. By observing the color and quantity of berries being collected the operator may make immediate fine adjustments in the vacuum pressure so that fewer unripe berries are picked or conversely so that more berries are picked (including less ripe berries). By this means the corp may be selectively gathered leaving behind green, less marketable, berries to ripen further and be gathered in a subsequent harvest. If desired, monitoring of the color of the berries being harvested could be automated with a light scanning device and color responsive optical detector means. The quantity of berries could be monitored by optical scanning apparatus as well. Such refinements are not believed to be necessary, however, since the apparatus of the invention is designed to permit visual monitoring by the vehicle operator or by other personnel attending to removal and replacement of bins such as 63.

As shown in FIG. 8, finger 99 retracts with strawberry 166 and when the strawberry releases from the vine, if not before, the retraction will bring the strawberry well within the outer circle of the ends of fingers 99. This permits the ends of fingers 99 which are not retracted to rotate closely to the collector 53. Thus, when the fingers reach the sector bounded by vanes 21 and 23 and extend due to the positive pressure therein, the strawberries are ejected into the collector 53 and are prevented from bouncing or rolling out due to the presence of the array of fingers closing off the front side of collector 53.

An alternative form of rotating support element is shown in FIGS. 9 through 12. In this alternative embodiment the cylindrical rotating support element 37 is replaced by an endless belt arrangement on which the same kind of vacuum fingers are mounted. The endless belt has the advantage that its path is not limited to a circular shape and the vacuum finger array facing downwardly in contact with the crop bed can have a larger footprint. This permits vacuum fingers 297 to be in operative position for a longer time or permits the speed of travel of the harvester to be increased while maintaining the same time in active position for the vacuum fingers. In the picking position fingers 297 are parallel rather than radially oriented as are fingers 97 or 99. Fingers 297 are of simpler non-tapered shape like fingers 97.

The alternative embodiment of FIGS. 9 through 12 has an air comb 247 which is generally similar to air comb 47 and is similarly connected to positive pressure duct 41. Another positive air duct 249 similar to air duct 49 connects to vacuum finger support element 237.

Endless belt 201 is guided over rollers 215, 217, and 219. 219 is a drive roller driven by a drive motor 281 similar to drive motor 81, but direct drive may be conveniently used to drive roller 219. Between the various rollers belt 201 runs over longitudinal slats 207, 209, and 211. Preferably roller 219, at least, is a crowned roller to maintain belt 201 laterally centered on it and on the other rollers. Roller 217 is formed with ribs 218 positioned and spaced like slats 209 so that roller 217 causes no obstruction to air flow through fingers 297.

Belt 201 may be of rubber or other elastomeric material or may alternatively be of thin flexible metal. Within vacuum finger support element 237 chambers are formed by panels 205, 225, 223, and 221. Negative pressure is maintained between panels 223 and 225 by duct 235 and positive pressure is maintained between panels 223 and 221 by duct 249. Panel 205 isolates the top of the belt from the pressure chambers.

Vacuum fingers 297 are secured over openings 296 in belt 201 and may be held in place by adhesive or other suitable means. Slats 209 and 211 are spaced apart so that there is no impediment to air flow through fingers 297, the holes 296 in belt 201, and into the interior of vacuum finger support element 237. Panels 203 close the sides of vacuum support element 237 and provide structural support for bearings 204 for the shafts of roller 215, and for bearings (not shown) for the other rollers.

From the foregoing description it will be seen that the alternative embodiment of FIGS. 9, 10, 11, and 12 is structurally arranged to operate with the same function as previously described with respect to the cylindrical rotating support element 37. The principal difference with the alternative embodiment is that the closed path of revolution for the vacuum fingers is elongated rather than circular. The collector 253 which is generally similar to collector 53 is located under a straight upwardly slanted portion of the path of belt 201 and fingers 297. Accordingly the strawberries would tend to drop into collector 253 by gravity and only a very low positive air pressure, or even atmospheric pressure, would be adequate for the chamber between panels 221 and 223. Thus positive pressure supply to this chamber may be omitted.

The operation of the apparatus of FIGS. 9 through 12 is essentially the same as previously described for the apparatus of FIGS. 1 through 8. In summary, as fingers pass from roller 215 past panel 225 they are subjected to vacuum pressure and if in contact with a strawberry will grip the strawberry and tend to retract. If the strawberry is ripe this may separate the strawberry from the plant, otherwise the strawberry will pull out of the grip of the vacuum as it passes roller 217 and starts on the upward slope guided by slats 211. Those strawberries separated and retained by vacuum fingers will be lifted over the edge of collector 253 and released as they pass panel 223, dropping into collector 253 by gravity or by ejection by positive air pressure. Collector 253 is provided with a conveyor (not shown) similar to that shown for collector 53 or with other suitable means for transporting the strawberries to drop onto horizontal conveyor 57.

From the foregoing description and explanation it will be seen that a harvester for strawberries, other fruits, or crops with generally spherical crop elements from one-half inch to several inches in diameter is provided having numerous advantages over previous apparatus. The vacuum fingers which come in contact with the crop have no sharp or hard surfaces and are ideally adapted to handle the crop gently. The pulling force applied to the crop may be adjusted so that excessively green fruit may be left behind for a second harvesting operation if desired.

While the apparatus has been described with reference to a crop such as strawberries grown in horizontal beds it will be appreciated that the general principles of the invention may be extended to crops grown on vertical vines, bushes, or trees; in such case the axis of rotation of the vacuum finger support element would be vertical rather than horizontal.

In addition to the variations and modifications to the invention that have been shown, described, or suggested, it will be apparent to those skilled in the art that other variations and modifications may be made within the scope of the invention, and accordingly the scope of the invention is not to be considered limited to the embdiments and modifications thereof shown or suggested, but is rather to be determined by reference to the appended claims.

What is claimed is:

1. A crop harvester comprising
   a vehicle having at least two wheels and a body supported thereby,
   means for generating a large volume air flow at a vacuum pressure mounted on said vehicle,
   a perforated support element on said vehicle body having a closed path of revolution,
   means for revolving said element with a peripheral speed approximately equal to that of said wheels,
   a plurality of closely spaced open-ended hollow finger elements affixed over the perforations of said support element,
   a collector for crop elements adjacent said support element, and
   means within said support element for directing air flow through selected ones of said finger elements at said vacuum pressure thereby causing crop elements with desired characteristics to be gathered to the end of said finger elements, separated from the crop plant, and deposited in said collector.

2. Apparatus as recited in claim 1 wherein said support element has the form of a hollow circular cylinder.

3. Apparatus as recited in claim 2 wherein said support element has a horizontal axis of rotation transverse to the direction of travel of said vehicle.

4. Apparatus as recited in claim 3 further including means for providing air flow to selected ones of said finger elements at a pressure positive with respect to atmospheric pressure.

5. Apparatus as recited in claim 1 further including means for directing air flow in a predetermined direction with a horizontal component located ahead of said support elements.

6. A crop harvester comprising
   a vehicle having at least two wheels and a body supported thereby,
   means for generating a large volume air flow at a vacuum pressure mounted on said vehicle,
   an at least partially hollow support element on said vehicle body having a closed path of revolution and means for revolving said element with a pheripheral speed approximately equal to that of said wheels,
   a plurality of closely spaced rows of a plurality of closely spaced elongated open-ended hollow bellows elements secured on said support element and having their interiors communicating with the interior of said support element,
   a collector for crop elements adjacent said support element, and
   means within said support element for directing air flow inwardly through selected ones of said bellows elements at said vacuum pressure thereby causing crop elements with desired characteristics to be gathered to the end of said fingers, separated from the crop plant, and deposited in said collector.

7. Apparatus as recited in claim 6 wherein said support element has the form of a hollow circular cylinder.

8. Apparatus as recited in claim 7 wherein said support element has a horizontal axis of rotation transverse to the direction of travel of said vehicle.

9. Apparatus as recited in claim 8 further including means for providing air flow to selected ones of said bellows elements at a pressure positive with respect to atmospheric pressure.

10. Apparatus as recited in claim 6 further including means for directing air flow in a predetermined direction with a horizontal component located in front of said support elements.

11. Apparatus as recited in claim 6 wherein said support element includes an endless belt and at least two rollers defining an elongated path therefor.

12. Apparatus as recited in claim 6 further including means for forming a compartment within said support element and a duct connecting said compartment with said means for generating a large volume air flow.

13. A crop harvester comprising
    a vehicle having at least two wheels with defined axes of rotation and a body supported thereby,
    means for raising and lowering at least a portion of said body relative to said wheels,
    means for generating a large volume air flow at a vacuum pressure and a second air flow at a pressure relatively positive to said vacuum pressure, the last said means being mounted on said vehicle,
    a perforated support element on said vehicle body having a closed path of revolution and an axis of revolution substantially parallel to the axes of rotation of said wheels and means for revolving said elements with a peripheral speed approximately equal to that of said wheels,
    a plurality of closely spaced open-ended hollow finger elements affixed over the perforations of said support element,
    a collector for crop elements adjacent said support element, and
    means within said support element for directing air flow through selected ones of said finger elements at said vacuum pressure and at said relatively positive pressure thereby causing crop elements with desired characteristics to be gathered to the end of said fingers, separated from the crop plant, and deposited in said collector.

14. Apparatus as recited in claim 13 wherein said support element includes an endless belt and at least two rollers defining an elongated path therefor.

15. Apparatus as recited in claim 14 wherein said means for directing air flow includes means for forming a compartment within said support element and a duct connecting said compartment with said means for generating a large volume air flow.

16. Apparatus as recited in claim 13 wherein said support element has the form of a hollow circular cylinder.

17. Apparatus as recited in claim 16 wherein said support element has a horizontal axis of rotation transverse to the direction of travel of said vehicle.

18. Apparatus as recited in claim 13 further including means for directing air flow in a predetermined direction with a horizontal component located in front of said support element.

* * * * *